April 29, 1941.  O. J. HORGER  2,239,890
TESTING APPARATUS
Filed Aug. 18, 1939   2 Sheets-Sheet 1

INVENTOR:
Oscar J. Horger
HIS ATTORNEYS.

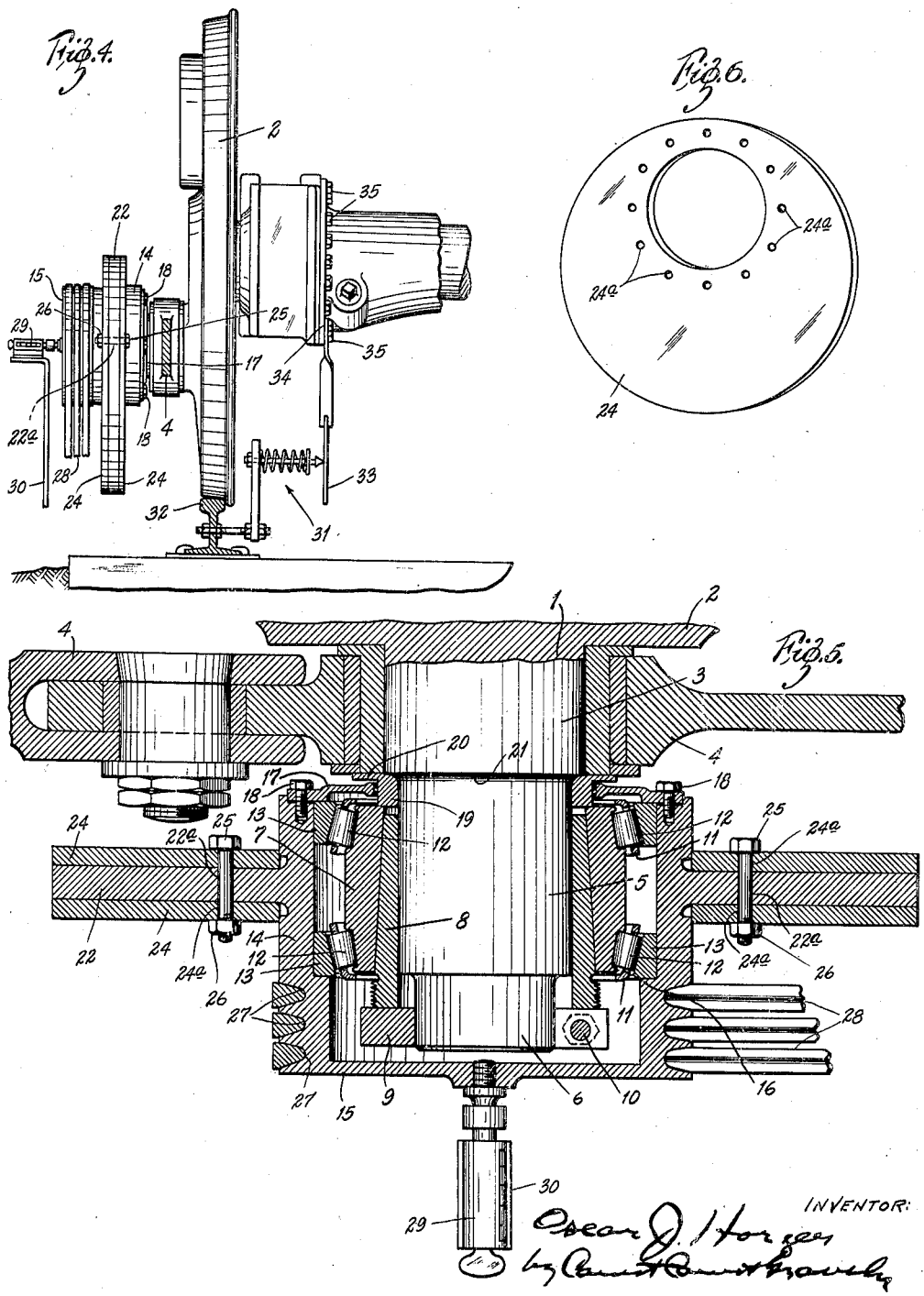

Patented Apr. 29, 1941

2,239,890

UNITED STATES PATENT OFFICE 2,239,890

TESTING APPARATUS

Oscar J. Horger, Canton, Ohio, assignor to The Timken Roller Bearing Company, Canton, Ohio, a corporation of Ohio Application August 18, 1939, Serial No. 290,728

6 Claims. (Cl. 74—61)

Increased speeds in railroad transportation in both freight and passenger service have created new problems, one of these being that of rail damage. In many instances, these increased speeds have resulted in widespread damage to rails necessitating constant repairs and replacements of rails.

To determine the causes of this rail damage, locomotive slipping tests have been made on greased tracks to produce high rotative speeds in the driver wheels and thus set up vibrations in said wheels. High speed motion picture cameras were mounted on the locomotives to photograph the driver wheels during the operation of the locomotives over the greased stretches of track. These pictures showed the driver wheels actually leaving the rails, rising an inch or more and coming down with considerable force to damage the rails. The slipping tests, while valuable, have practical limitations due to inability to control many variable factors. To determine the causes for this lifting, more fundamental information is necessary.

This invention relates to testing apparatus, and more particularly, to apparatus for imparting vibrations to a locomotive driver wheel. The principal objects of my invention are to devise apparatus for producing forced vibrations in a stationary locomotive to simulate actual operating conditions; to devise a vibration apparatus in which the degree of unbalance may be varied; to produce a vibrator which may be easily and simply applied to a stationary locomotive; to measure the vibrations in various parts of the locomotive and to measure the number of revolutions made by the vibrator; and also to produce testing means by which vibrations and other factors may be controlled to provide data over a wide range of varying conditions.

My invention consists principally in an oscillator comprising an eccentric weight of three eccentric disks which is mounted on a roller bearing on the main crank pin of a locomotive driver wheel.

Figure 1:
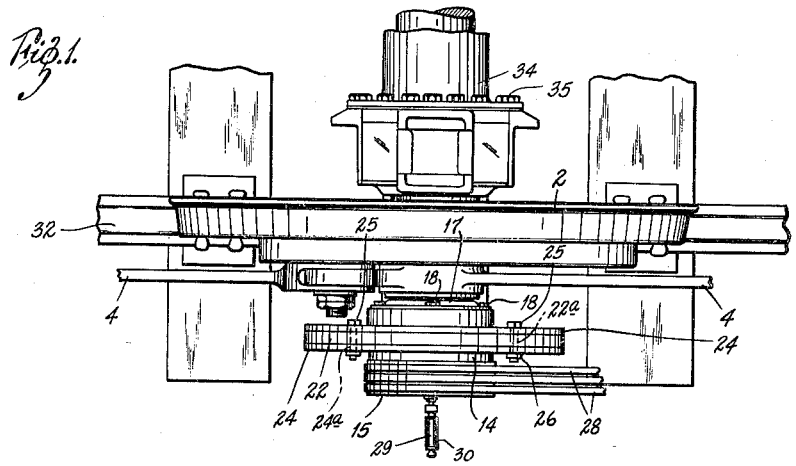
Figure 2:
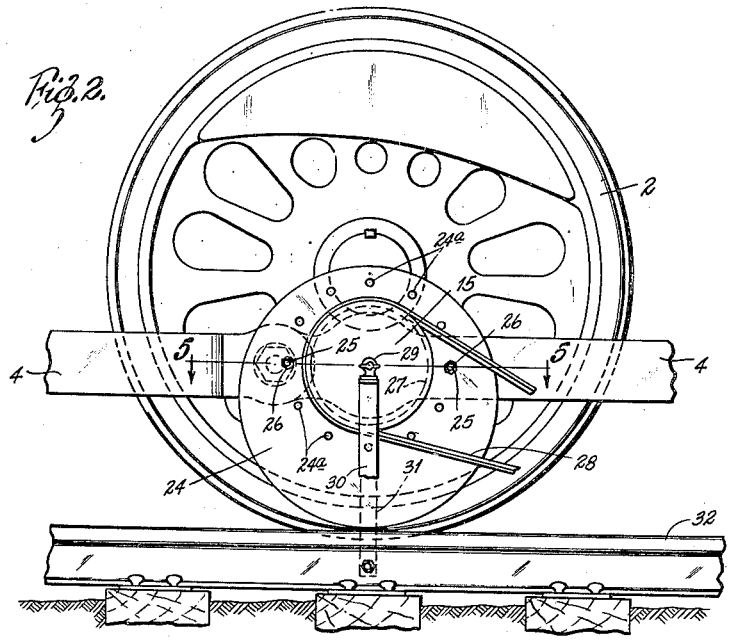
Figure 3:
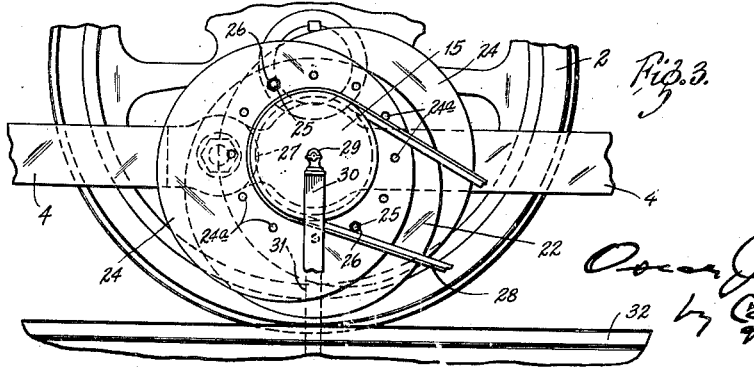

In the accompanying drawings, wherein like reference numerals refer to like parts wherever they occur, Fig. 1 is a plan view of a locomotive driver wheel embodying my invention, Fig. 2 is a side elevation of a locomotive driver wheel embodying my invention, Fig. 3 is a view similar to Fig. 2 of part of a locomotive driver wheel showing the eccentric disks positioned differently than in Fig. 2, Fig. 4 is a side elevation of one end portion of a locomotive driver wheel embodying my invention, Fig. 5 is a cross sectional view taken on line 5—5 in Fig. 2; and Fig. 6 is a perspective view of one of the eccentric disks embodied in my invention.

The present construction is adapted to be used on a crank pin 1 of a main driver wheel 2 of a stationary locomotive from which the main rod has been detached. The crank pin comprises three portions projecting beyond the wheel, namely, a side rod portion 3 on which the side rod 4 is mounted, a main cylindrical portion 5 next to the side rod portion and on which the main rod is mounted, and a cylindrical portion 6 of somewhat smaller diameter at the outer end of the pin.

So far, the usual crank pin construction has been described with only the main rod detached, the side rods remaining in their positions. In my invention, a roller bearing with a cone or inner raceway member 7 is mounted on the main portion 5 of the crank pin 1. This cone or inner raceway member has a tapered bore and is mounted by means of a tapered adapter sleeve 8 positioned in said bore and on the crank pin. In locomotives having roller bearing crank pins this adapter sleeve is unnecessary. The tapered adapter sleeve is held in position by a split ring fastener 9 abutting against the outer end of the sleeve and encircling the smaller cylindrical portion 6 of the crank pin. The ends of the split ring fastener are secured together by a bolt 10. Mounted on the cone or inner raceway member 7 of the bearing and positioned by cages 11 are series of rollers 12. The drawings illustrate tapered rollers arranged with their large ends facing each other. Outer raceway members or cups 13 are provided for said rollers.

A cylindrical housing or casing 14 whose outer end has an integral closure portion 15 is mounted on the bearing. A shoulder 16 in said housing abuts against the outermost cup. The inner end of the housing is closed by a removable closure ring 17 secured to the housing by bolts 18 or other suitable fastening means. The removable closure member cooperates with a spacing ring 19 provided with a peripheral flange 20 at its inner end. This spacing ring is mounted on the main cylindrical portion of the crank pin. The inner face of said spacing ring abuts against a shoulder 21 in the inner cylindrical portion 3 of the crank pin.

Extending radially from the housing or casing and integral therewith is an eccentric disk 22 provided with a series of holes 22a extending through an arc near the inner periphery of the disk. On each side of this disk is a detachable eccentric disk 24 of one half the weight of the fixed disk, each of the smaller disks being provided with holes 24a corresponding to the holes in the fixed disk. These disks are fastened to the fixed disk 22 as by bolts 25 extending through alined holes 22a and 24a and nuts 26 on said bolts. The position of the outer disks can be varied in respect to the inner disk by rotating the outer disks and bolting the disks together in their changed location.

The cylindrical housing is provided at its outer end with grooves 27 adapted to cooperate with belting 28 driven by any suitable means.

In the operation of the vibrator, the total number of revolutions is recorded by means of a suitable revolution counter 29 mounted on a suitable support 30 and connected to the center of the integral closure member of the cylindrical housing and the speed may be checked by the number of revolutions during a given time.

The amplitude of the vibrations is measured by any suitable means, as by scratch gages or oscillographs attached to the track, the driving springs, the axle, the wheel assembly, or at any of the desired locations. The drawings illustrate a scratch gage 31 secured to the track 32. The point of the scratch gage is in contact with a plate 33 secured to the axle housing 34 by one of the bolts 35 in the axle housing.

The manner of using the hereinbefore described device is as follows. The main rod is detached from the crank pin 1 of a stationary locomotive, the side rods 4 remaining attached. My device is then mounted on the main crank pin. The housing 14 is rotated by belts 28 driven by suitable motors. This rotates the eccentric disks 22, 24 and the rapid rotation of these unbalanced disks sets up forced vibrations in the driver wheel 2 and other parts of the locomotive. These vibrations can be measured by suitable devices to obtain information about these vibrations in the different parts of a locomotive. The speed of the rotation can be varied to give the equivalent of different rates of speed in a moving locomotive and the positions of the outer eccentric disks may be altered in respect to the inner to give changes in balance, for example, a complete balance, a maximum amount of unbalance, or any intermediate amount of unbalance. If desirable, vibrators may be mounted on both sides of the locomotive.

By means of this vibrator general and specific information and data may be learned concerning the reaction of a locomotive operated at high speeds. Sufficient vibrations may be set up to cause the driver wheels to lift off the rails. More definite information may be obtained about such matters as the impact factor or the force of impact of the wheels against the rails, the natural frequency of vibrations of a locomotive on its springs, the effect of locomotive springs in restraining and damping vibrations, the modulus of the track foundation or a measurement of track stiffness and ballast conditions. Heretofore, this modulus was always computed from static measurements. From such data the performance of a locomotive at various speeds can be calculated in advance. By conducting tests on different tracks, a suitable track structure for the operation of high speed trains can be determined.

What I claim is:

1. A vibrator for a stationary locomotive driver wheel having a projecting crank pin comprising a roller bearing on said crank pin, a sleeve on said roller bearing, an adjustable weight on said sleeve, means for rotating said sleeve and means for preventing rotation of said wheel.

2. A vibrator for a locomotive driver wheel or the like having a projecting crank pin, which comprises a bearing on said pin, a sleeve surrounding said bearing, a weight on said sleeve, means for rotating said sleeve and means for preventing rotation of said wheel.

3. A vibrator for a locomotive driver wheel or the like having a projecting crank pin, which comprises a roller bearing on said pin, a sleeve surrounding said bearing, a weight on said sleeve, means for rotating said sleeve and means for preventing rotation of said wheel.

4. A vibrator for a stationary locomotive driver wheel having a projecting crank pin comprising a roller bearing on said crank pin, a sleeve on said roller bearing, an eccentric radially disposed disk fixed on said sleeve, eccentric disks adjustably secured to said fixed disk, means for rotating said sleeve and means for preventing rotation of said wheel.

5. A vibrator for a locomotive driver wheel having a projecting crank pin comprising a roller bearing on said crank pin, a sleeve on said roller bearing, an eccentric radially disposed disk fixed on said sleeve, eccentric disks removably secured to said fixed disk, one on either side thereof, means for rotating said sleeve and means for preventing rotation of said wheel.

6. A vibrator for a locomotive driver wheel having a projecting crank pin comprising a roller bearing on said crank pin, a sleeve on said roller bearing, an eccentric radially disposed disk fixed on said sleeve, eccentric disks removably secured to said fixed disk, one on either side thereof, means for rotating said sleeve and means for preventing rotation of said wheel.

OSCAR J. HORGER.